S. BEAUCHAMP.
EYEGLASS OR SPECTACLE LENS CLAMP.
APPLICATION FILED SEPT. 27, 1909.
963,851.
Patented July 12, 1910.
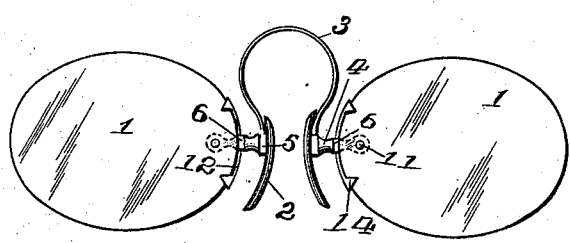
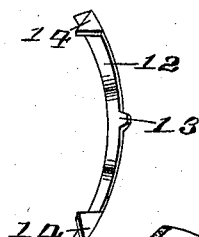
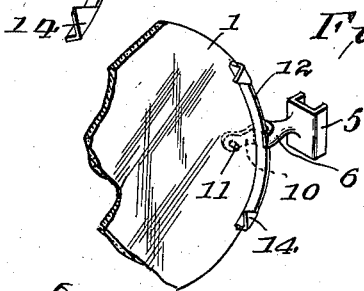
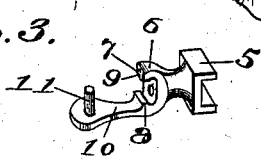
Witnesses
C. M. Catlin
M. Haynie
Inventor
Samuel Beauchamp,
By Gould & Gould
Attorneys

UNITED STATES PATENT OFFICE.

SAMUEL BEAUCHAMP, OF TERRE HAUTE, INDIANA.

EYEGLASS OR SPECTACLE LENS CLAMP.

963,851.  Specification of Letters Patent.  Patented July 12, 1910.

Application filed September 27, 1909. Serial No. 519,691.

*To all whom it may concern:*

Be it known that I, SAMUEL BEAUCHAMP, a citizen of the United States, residing at Terre Haute, in the county of Vigo and State of Indiana, have invented certain new and useful Improvements in Eyeglass or Spectacle Lens Clamps, of which the following is a specification.

The invention relates generally to mountings for eyeglasses and spectacles and specifically to a lens stud-clamp adapted for operative engagement with the lens without the employment of the usual disadvantageous attaching screw.

It is well known that the breakage of eyeglass lenses is an annoyance of frequent occurrence to eyeglass users due to the accidental displacement of the glasses from the nose of the wearer and contact with the ground or other object. Such breakage is due in a large proportion of instances to the rigid, unyielding contact with the lens of the screw attaching the stud of ordinary construction to said lens which, in many instances would be able to withstand forcible impact with the ground or other object were it not made particularly frangible at the point of contact with the said screw and the members of the stud which are necessarily tight-fitting in order to maintain the lens in the proper plane in a secure manner.

One object of the present invention is the provision of a stud-clamp which when applied to a lens will operatively maintain the latter in desired relation to the coöperating lens and to the bridge and nose clamp without the aid of the usual stud screw.

Another object is to provide a stud-clamp which is adapted to be quickly and easily adjusted in operative position on the lens and as readily disengaged therefrom without the use of supplementary tools or instruments, the device being formed to permit such positioning and disengagement solely by the hands of the operator.

Another object is to produce a stud-clamp which, while being practically effective in performing all required functions, shall be formed of but few parts of simple construction.

With these and other objects in view the invention will now be described in the following specification, taken in connection with the accompanying drawings, and then more particularly pointed out in the claims.

In the drawings, Figure 1 is an elevation of a pair of eyeglasses with my improved stud-clamp in operative position thereon. Fig. 2 is a perspective of the clamp member of the device, and Fig. 3 is a perspective of the stud member of the invention. Fig. 4 is a broken perspective, showing the clamp member and the stud member assembled in lens-embracing coöperative relation.

Referring now to the drawings, wherein similar reference characters refer to like parts throughout the several views, and wherein is embodied the preferred details of my invention, 1 denotes the lenses of a pair of eyeglasses, said lenses being of ordinary construction and relative position, the nose clamp and bridge being indicated respectively by 2 and 3 and also of ordinary form and construction.

4 indicates the stud member of my improved device embracing the usual screw-threaded stirrup 5 for the reception and retention of one end of the bridge piece 3 and one member of the nose clamp 2. Slightly spaced from said stirrup 5 and disposed in approximately the same relative position to the body of the stud as said stirrup is a clamp stirrup 6, formed with a downwardly-extending lip 7 positioned in alinement laterally of the stud body with an upwardly-extending lip 8, said lips being formed integral with the body of stirrup 6. Downwardly-extending lip 7 is provided with a stud-receiving aperture 9 for a purpose to be later explained.

10 denotes the stud shank designed, when in operative position, to lie closely contiguous the lens to which it is applied and is provided with lens lug 11 formed preferably of a length equal approximately to the thickness of the lens through the usual aperture in which it is designed to pass without friction when the parts are operatively assembled. Stirrup 6 is designed to receive and maintain in desired position a spring lens clamp 12 formed of a single strip of thin, resilient material and disposed in such arcuate outline as to appropriately conform to the curvature of the lens at the point to which said clamp is to be applied, as illustrated. Clamp 12 is provided centrally of its upper edge with an upwardly-projected lug 13 and near either terminal with a clip 14 of any desired outline but by preference as illustrated, and extending approximately at right angles to the contiguous portion of the body of the clamp, said lug and clips being formed integrally with said body. The body portion of the clamp 12 is formed co-extensive in width with the thickness of the lens, and, as before stated, conforms in curvature with that section thereof against which it abuts when in position, the said clamp, when assembled in operative engagement with stirrup 6 passing between the rear walls of the alined lips 7 and 8 and the rear wall of said stirrup, said lips and rear wall being suitably spaced to snugly embrace the clamp and retain it in fixed stable relation to the stud member, lug 13, in the operation of assembling the clamp and stud being passed through aperture 9, and bearing against the upper lip 7, the construction just described serving to retain the middle portion of the clamp in rigid relation to the stirrup 6 while permitting limited spring movement of the clamp terminals as necessary in positioning the device on the lens.

In positioning the device in operative position on a lens, lug 11 is partly seated in the coöperating lens aperture, the terminals of clamp 12 bent slightly in a rearward direction and the inner edge of the lens brought to abut the outer face of lips 7 and 8 and the terminals of the clamp released from tension, when the clips 14, properly guided, are sprung over the edges of the lens against the rear face of which they lie flat, practically in the same plane as the lens itself, the lens lug 11 being seated, simultaneously with the clip positioning movement, its entire length in the lens aperture, it being understood that the coöperating parts of the device and lens are of such dimensions and relative proportions that the tension of the spring clamp normally secures and holds in desired position the lens to which the device has been adjusted, lug 11 being entered from one face of said lens and the clips 14 bearing on the opposite face under tension of the spring clamp effectually preventing any tendency of the lens to accidental disarrangement from its normal position.

From the foregoing it will be seen that I have provided a stud-clamp which, while of such dimensions as to entirely avoid obstruction of the vision of the user, effectively accomplishes the purpose for which it is designed and can be readily attached to and disconnected from a lens of ordinary form without employing an attaching screw or the use of a tool.

What I claim as new and desire to secure by Letters Patent, is:—

1. A stud for eyeglasses formed with a clamp stirrup, a spring clamp to fit within the stirrup, and lens engaging clips carried by the clamp.

2. A stud for eyeglasses formed with a clamp stirrup, a spring clamp to fit within the stirrup, lens engaging clips carried by the clamp and a shank projecting from the stud, said shank and clips being designed to engage opposite faces of the lens.

3. A stud for eyeglasses including a shank to bear against one face of the lens, a lug carried by the shank to seat in an aperture of the lens, a spring clamp frictionally secured within the stud, and clips carried by the clamp to engage the face of the lens opposite to the shank.

4. A stud for eyeglasses formed to provide a stirrup, a spring clamp designed to seat in said stirrup, a lug carried by the clamp to engage an opening formed in the stirrup to secure the parts, and lens engaging clips carried by the clamp.

5. A stud member for an eyeglass mounting including a body formed at one end with spaced walls for the reception of the bridge piece and nose clamp, said body being formed intermediate its ends to provide a clamp stirrup including spaced undercut walls, a spring clamp frictionally secured in the stirrup, a shank extending beyond the clamp stirrup and in approximate alinement with one of the walls thereof, and a lug projecting from the shank adjacent the free terminal thereof.

In testimony whereof, I affix my signature in presence of two witnesses.

SAMUEL BEAUCHAMP.

Witnesses:
 PHILIP SCHEMBER,
 HENRY H. WOLF.